United States Patent [19]
Seelig et al.

[11] Patent Number: 5,986,753
[45] Date of Patent: Nov. 16, 1999

[54] WAFER HOLDING AND ORIENTING FIXTURE FOR OPTICAL PROFILOMETRY

[75] Inventors: Matthew E. Seelig; Silvio P. Marchese-Ragona, both of Rochester, N.Y.

[73] Assignee: Chapman Instruments Inc., Rochester, N.Y.

[21] Appl. No.: 09/037,203

[22] Filed: Mar. 9, 1998

[51] Int. Cl.$^6$ .......................... G01N 21/01; G01B 11/24
[52] U.S. Cl. .......................................... 356/244; 350/376
[58] Field of Search ................................ 356/244, 371, 356/376

[56] References Cited

U.S. PATENT DOCUMENTS

| | | | |
|---|---|---|---|
| 5,017,012 | 5/1991 | Merritt et al. | 356/371 |
| 5,369,490 | 11/1994 | Kawai et al. | 356/376 |

Primary Examiner—Richard A. Rosenberger
Attorney, Agent, or Firm—M. Lukacher; K. Lukacher; R. C. Brown

[57] ABSTRACT

An optical profilometer having a movable head for measurement of the profile of a surface of a wafer under test in response to an optical beam projected by the head and incident onto the surface. The wafer may be a substrate for a data storage disc, and the surface may be one of a plurality of surfaces of the wafer, including the side face, the edge, and a radius or bevel therebetween. A fixture for holding the wafer includes a frame for orienting the wafer and also pivotally rotating the wafer about an axis. A vacuum chuck holds the wafer on the frame. An actuator orients the fixture frame in an plurality of positions spaced angularly about the axis to present selected ones of the wafer surfaces to the beam for profile measurement. Wafers of various diameters may be accommodated on the fixture.

14 Claims, 10 Drawing Sheets

WAFER HOLDING AND ORIENTING FIXTURE FOR OPTICAL PROFILOMETRY

The present invention relates to profiling systems and particularly to profilometers, also known as profilers, for measurement of the profile of the surfaces of a member under test to high resolution (atomic distances or nanometer range). The invention, still more particularly, relates to an orienting and holding fixture so that such high resolution accurate measurements of the profile of the member can be made of a plurality of surfaces of the member under test.

The invention is especially suitable for use in profilometers or accurate profiling of wafers used in the manufacture of semi-conductor devices such as integrated circuits, the wafers may be in the form of discs for data storage in computers, more particularly so-called computer hard discs.

To enhance the flexibility of profiling systems it is desirable to present all of the surfaces of a member which affect product quality for profile measurement. In the case of wafers, including discs, these surfaces are the polished side, the edge and the bevel or radius between the polished side and the edge. Positioning accuracy compatible with accurate profiling as well as high speed positioning are requirements which are difficult to obtain, particularly since interference with the optical components, and especially the travel of the optical head must be avoided without engendering multiple adjustments and time-consuming setup of the system for profiling.

The measurement of the spatial features and profile of surfaces around the edge and between the edge and the face (the radius or bevel) have been difficult to combine with measurements of the side face. The edge measurement, particularly of discs, requires scanning in a circular path around the disc without affecting the travel of the head.

It is a feature of the present invention to provide a profilometer with improved fixturing which can orient a wafer for side surface measurement while also providing for orientation of the wafer either vertically or at an angle between horizontal and vertical so as to present the bevel or radius surface for profiling, and in the edge and bevel/radius profiling position to permit measurement around the complete circumference of the wafer.

Another feature of the invention is to provide rigid support which minimizes motion of the wafer which can affect the profile measurement and yet enable the side and edge and bevel/radius surfaces to be presented for profiling.

Still another feature of the invention is to provide facility for manual orientation not only in mutually orthogonal directions (X, Y and Z), but also angularly by tilting the member under test by manipulation without the need for automated or motor-driven (especially robotic) facilities.

It is a further advantage of the invention that a mechanism is provided for tilting the member under test which provides vernier adjustment of tilt position, particularly where a bevel or radius between an edge and side surface is to be carried out. This surface can be scanned circumferentially with a beam which is incident thereon at different incidence angles thereby facilitating the measurement of deviation of the bevel or radius surface from predefined orientations with respect to the edge or side surface.

A still further feature of the invention is to provide an improved profilometer of the type using phase differential measurements with polarized coherent light, having an optical head for projecting a beam of laser light and a fixture for holding and orienting a member under test both angularly and linearly so as to present side and edge surfaces thereof as well as surfaces intermediate the side and edge surfaces (bevel/radius surfaces) so that the beam is incident thereon and reflected therefrom while the surface and the head are movable with respect to each other.

Briefly described, an optical profilometer embodying the invention uses a movable head for measurement of the profile of a surface of a member under test in response to an optical beam projected by the head and incident on the surface. The surface can be one of a plurality of surfaces of the member. A holding and orienting fixture embodies a mechanism for orienting the member which includes a frame supporting the member under test pivotally for rotation about an axis. An actuator is connected to the frame and orients it in a plurality of positions spaced angularly about the axis whereby to present selected ones of these surfaces to the head and the beam projecting therefrom for measurement of the profile of these surfaces.

The foregoing and other features, objects and advantages of the invention as well as a presently preferred embodiment thereof will become more apparent from a reading of the following description in connection with the accompanying drawings, brief descriptions of which drawings are as follows:

BRIEF DESCRIPTION OF THE DRAWINGS

FIG. 9 is a rear elevation of the frame similar to FIG. 6, but with the guides and support for the air chuck assembly to be removed, the view illustrating the means for moving the wafer edge positioning posts away from the wafer edges to disengage from the wafer edges when the chuck is in holding relationship with the wafers, sufficient vacuum then being applied to the chuck, the mechanism including a pair of slides, one for each of a set of pins which can be assembled to the slides in different positions corresponding to the diameter of the wafer and a crossbar actuable by a pneumatic (vacuum) cylinder for articulating the pin support bars and moving them out of engagement with the edge of the wafer when the vacuum pressure overcomes a threshold corresponding to the bias of a return spring on the cylinder shaft;

DETAILED DESCRIPTION

Figure 1:
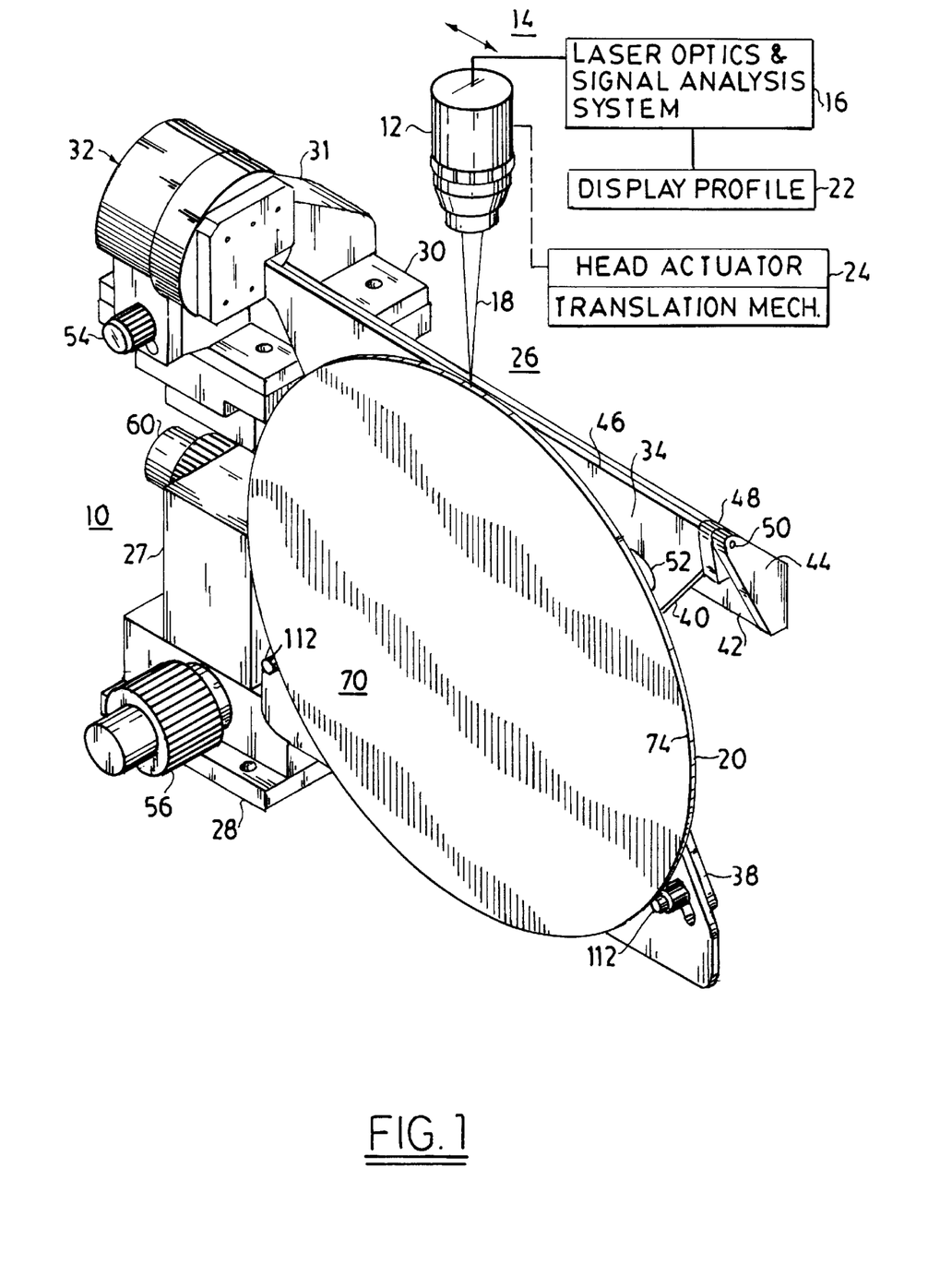
FIG. 1 is a perspective view schematically showing an optical profilometer and illustrating the wafer holding and orienting fixture thereof positioned for measurement of the profile of an edge of the wafer.

Referring first to FIG. 1 there is shown a profilometer 10. A head 12 is part of laser phase differential surface profile measurement system 14 of the profilometer 10. The system includes a laser optics and signal analysis system 16, which may be included in the head 12, and projects a laser beam 18 which is incident on the member under test 20. A wafer, of semi-conductor material which is used in the manufacture of integrated circuits is the member under test illustrated in FIG. 1. Other wafers such as used as computer memory hard discs for example may be the member under test. The light reflected from the surface being measured is analyzed and a display 22 of the profile is obtained as on monitor or plotter. The head 12 of the profilometer may be mounted in rails of a chassis so as to be movable over a linear path. Head movement is effected by a head actuator translation mechanism 24 for reciprocating the head along the rails. The display 22 may be driven by a computer which is part of the signal analysis system 16. The computer may also be coupled to the translation mechanism 24 so as to provide head movement synchronous with profile analysis. Then the display, which may be an image on the computer monitor, will have spatial correspondence to the profile of the surface which is being measured. The computer may be programmed to acquire profiling data from the profiler system and analyze the data to determine test results (in or out of spec.) for display, printout storage, or transmission to remote sites.

The phase differential profiling system 14 is suitably of the type described in U.S. Pat. No. 5,017,012, issued May 21, 1991 and assigned to Chapman Instruments, Inc. of Rochester, N.Y. USA. The head and the actuation thereof may be as provided by a profiling system, Model MP 2000, which is commercially available from Chapman Instruments.

The profilometer includes the fixture 26 which holds and orients the wafer 20. The fixture 26 is mounted to the base of the profilometer chassis by a base plate 28 thereof. The base plate is part of a translating (X, Y and Z) stage 27 having an upper mounting plate 30. The fixture 26 has a tilting mechanism 32 which is mounted on the plate 30. The stage 27 provides a column structurally supporting the tilt mechanism 32 and a frame assembly 34. The stage 27 may be of the type, Model CTC-587 which is commercially available from DYNA OPTIC MOTION of Laguna Hills, Calif., USA.

Figure 2:
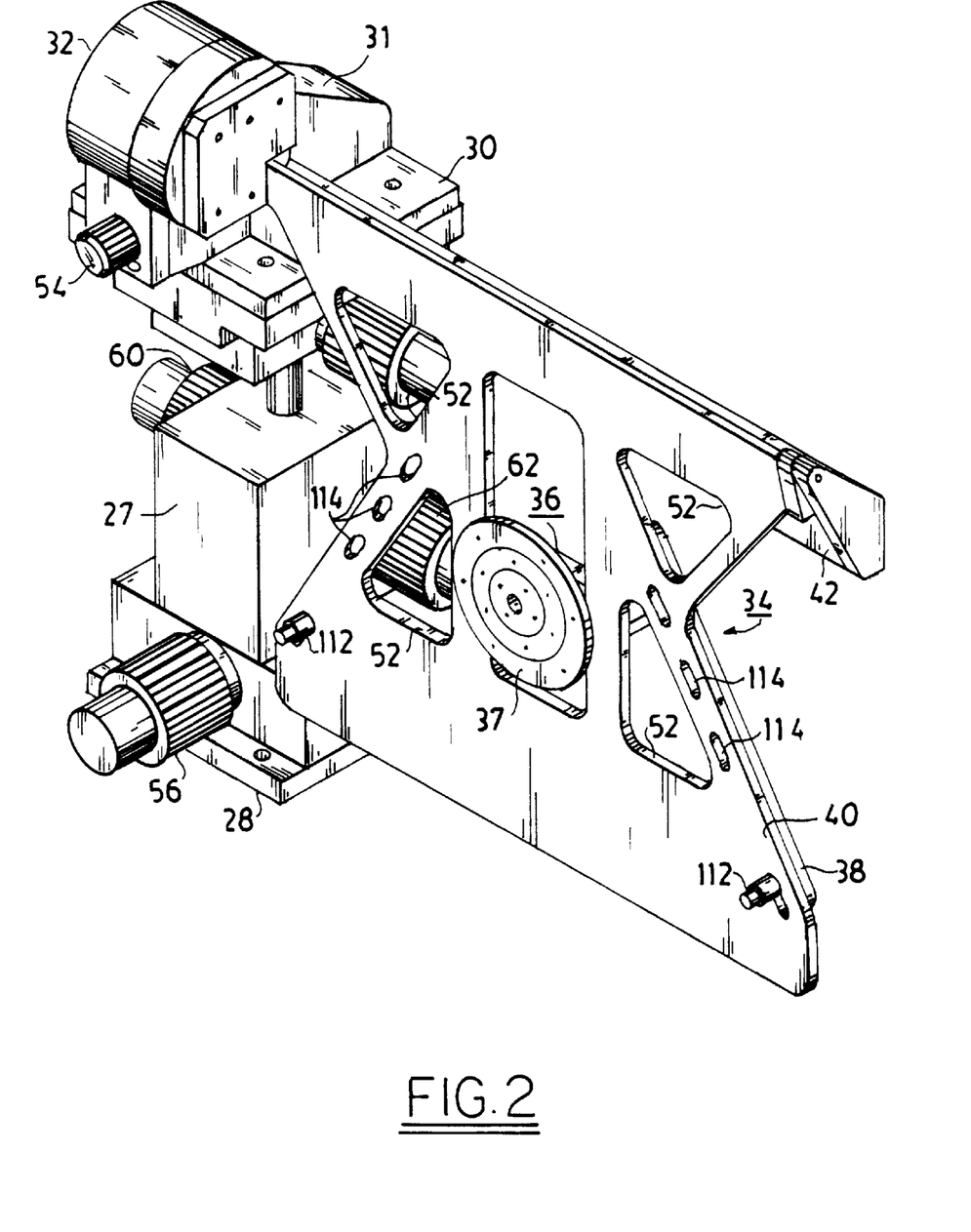
FIG. 2 is a perspective view illustrating the wafer and holding fixture as a complete assembly, but with the wafer removed and in the same position as in FIG. 1.
Figure 4:
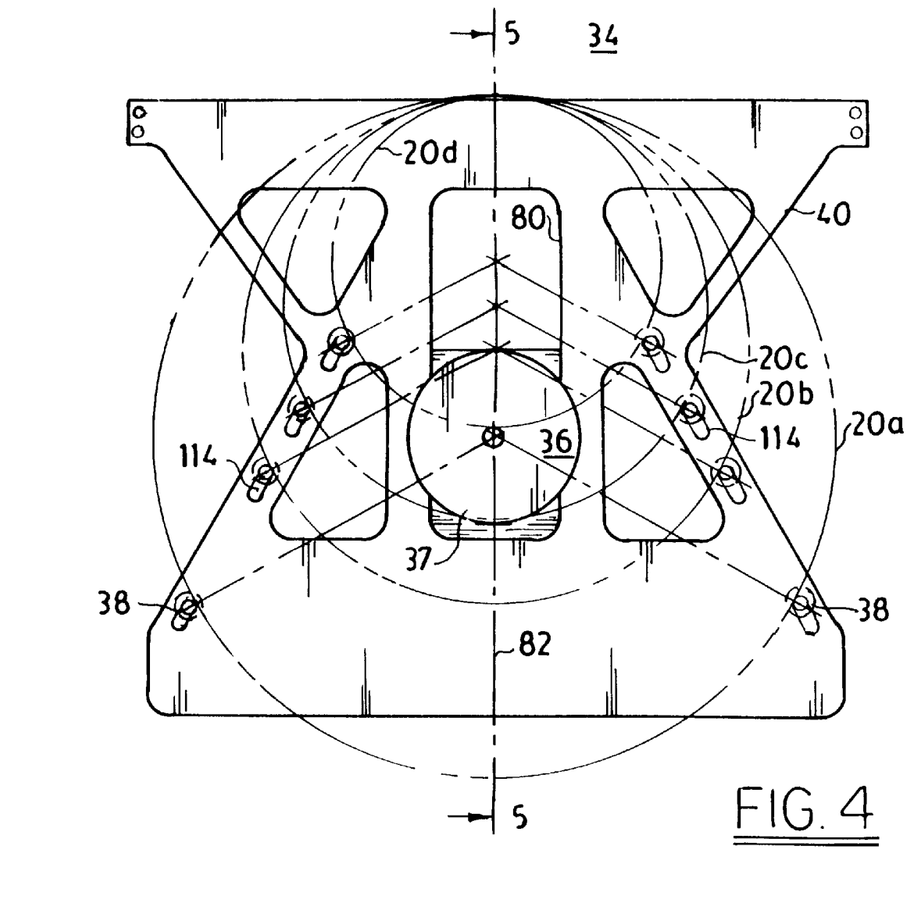
FIG. 4 is an elevational view of the frame and pneumatic (vacuum) chuck of the holding and orienting fixture showing in dash line circles, wafers of different diameter and centering posts which are effective in locating the wafers of different diameter, the chuck being movable in the frame to accommodate the different diameter wafers.
Figure 5:
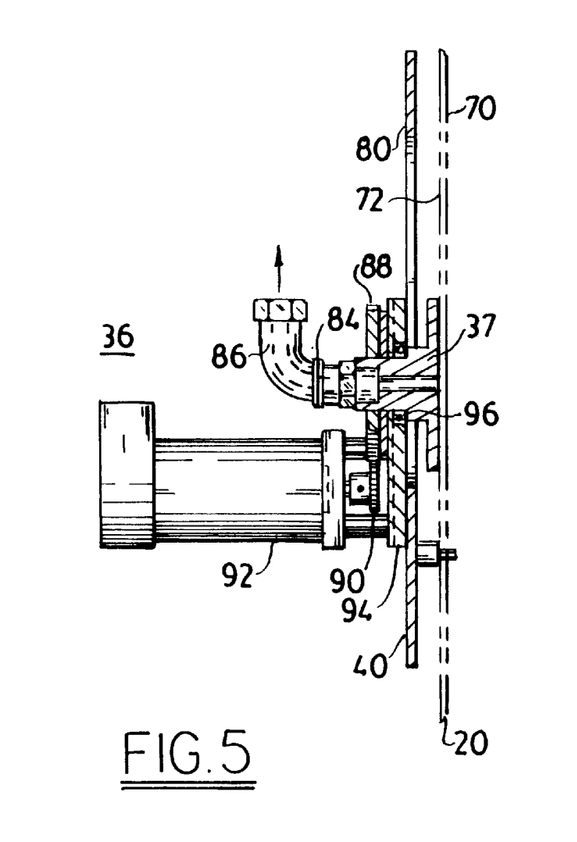
FIG. 5 is a sectional view taken along line 5—5 of FIG. 4 showing the frame, the chuck penetrating the frame, a vacuum supply connected through a rotary seal to the chuck which can hold a wafer, as shown in phantom on the right side of the figure, positioned on one of the centering posts and also showing a motor and gear train for rotating the wafer by means of the chuck, the motor being equipped with a shaft encoder for providing information as to the angular position of the wafer.
Figures 6, 7, 8:
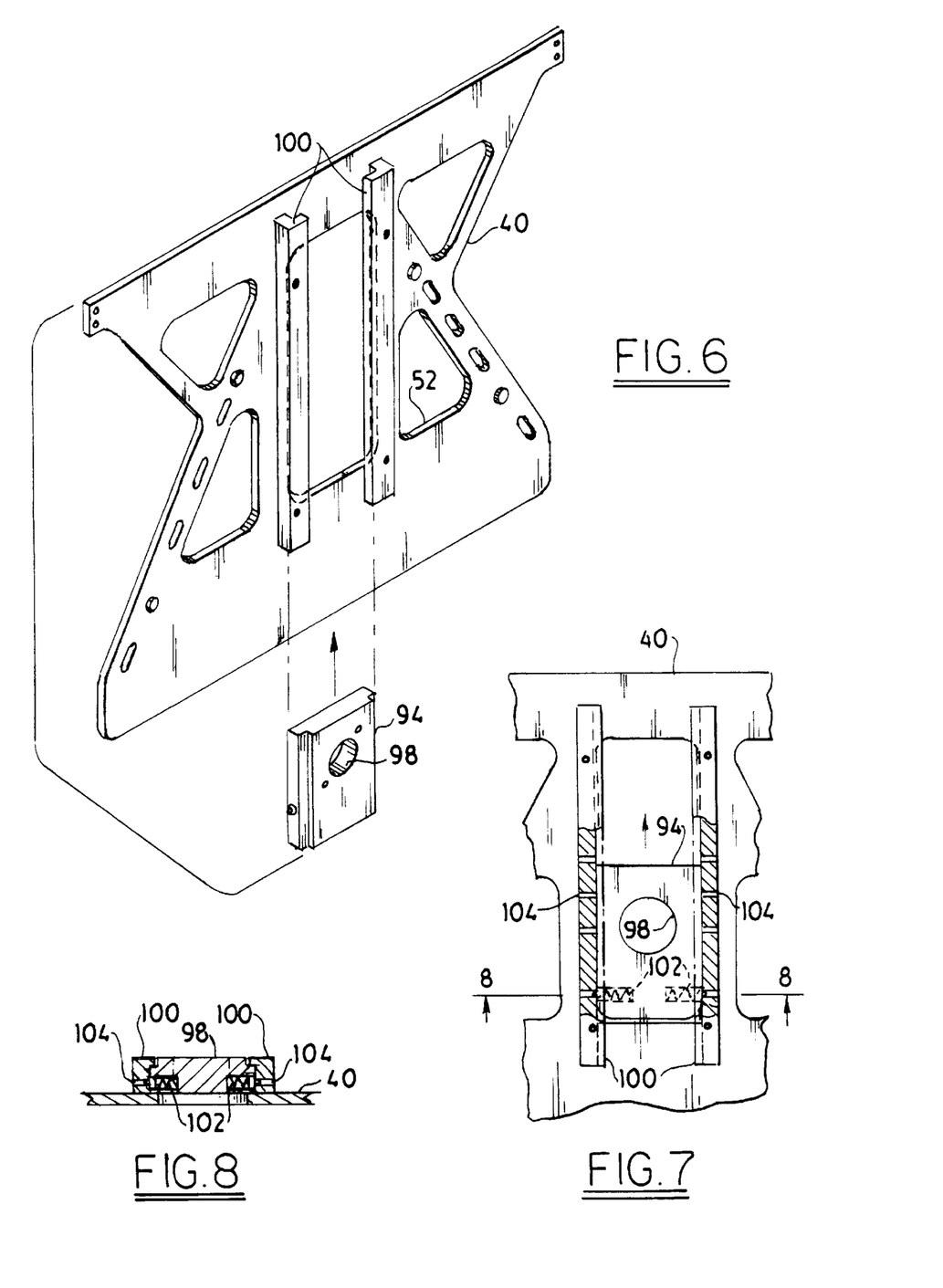
FIG. 6 is a perspective view of the backside of the frame showing guide rails in which a slide which mounts the chuck assembly, is movable longitudinally along the rails to bring the air chuck assembly to the different positions for holding wafers of different diameter.
FIG. 7 is a fragmentary enlarged view of the assembly illustrated in FIG. 7 showing the rails broken away to illustrate holes for receiving detents mounted in the slidable support for the chuck assembly which enables the chuck assembly to be positioned in different positions, spaced longitudinally from each other along the siderails to accommodate wafers of different size.
FIG. 8 is a fragmentary sectional view taken along the line 8—8 in FIG. 7 illustrating the detent operative in the lowermost position.
Figure 12:
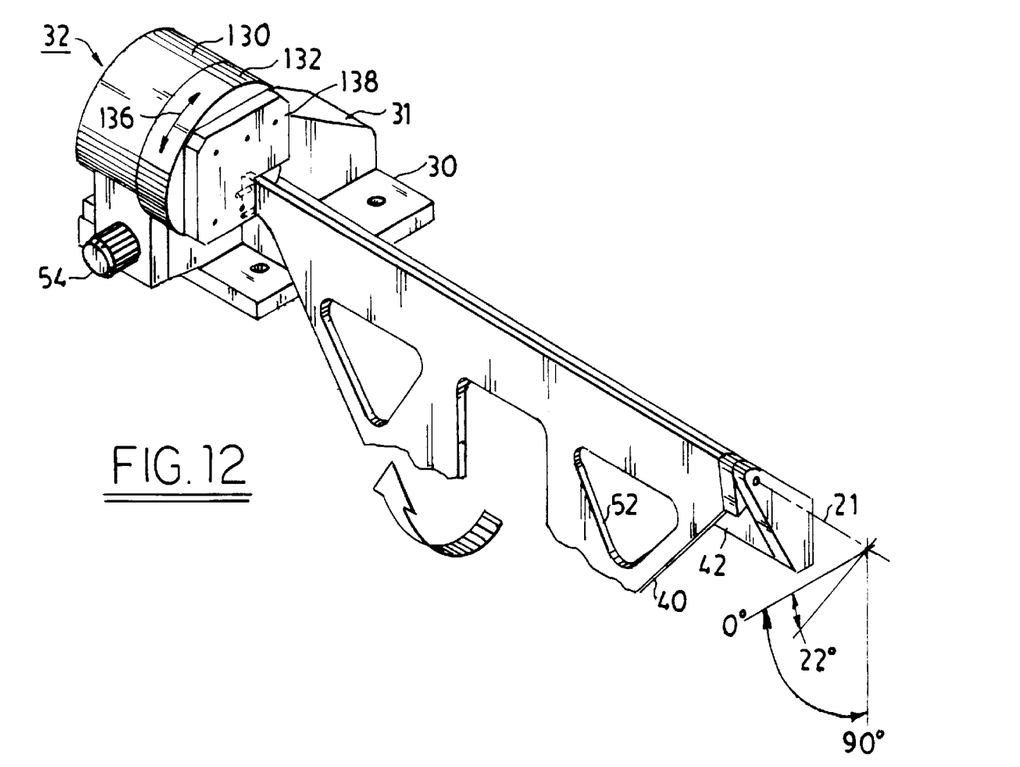
FIG. 12 is a view similar to FIG. 2 which illustrates the upper portion of the frame and the mechanism for tilting the frame to either 0 degree (horizontal), 90 degree (vertical) and 22 degree from horizontal positions.

The wafer 20 is mounted and held on the frame assembly 34. This assembly mounts a pneumatic or vacuum chuck assembly 36 (FIGS. 2 and 5). The frame assembly includes a mechanism for positioning the chuck (FIGS. 6, 7 and 8) and a mechanism 38 for aligning the wafer 20 with the chuck. The chuck 36 and the mechanism 38 enables wafers of different diameter to be mounted in the frame assembly 34, as is shown in FIG. 4 where wafers 20A. B. C and D are shown in phantom on the frame assembly 34. A frame plate 40 (FIG. 2) is the part of the frame assembly 34 on which the chuck assembly 36 and the alignment mechanism 38 are mounted. The frame plate 40 is mounted so as to extend as a cantilever from the tilt mechanism 32. The frame assembly 34 is effectively hung on and offset from the stage 27 for pivotal movement about a horizontal axis 21 (FIG. 12). The weight of the frame plate may be reduced by being notched along its sides and perforated by generally triangular holes 52 (see FIG. 2).

To strengthen and rigidify the frame assembly and yet allow it to be mounted as a cantilever and hung from the stage 27, there is provided a cantilever beam 42 which is connected to the support plate 30 and a block 31 on the plate 30. One end of this beam 42 is mounted to the base 30 and block 31. The opposite end has an ear 44 defining a journal for a shaft which is connected to the outer end of the frame plate 40 near the top edge 46 thereof. An ear 48 at the upper edge 46 mounts the pivot shaft for the frame assembly 34. This pivot shaft extends into the journal in the ear 44. The journal on the position of the shaft is indicated by the bore 50 of the journal. The axis of the journal and shaft is the pivotal axis of the frame assembly 34.

Figure 3:
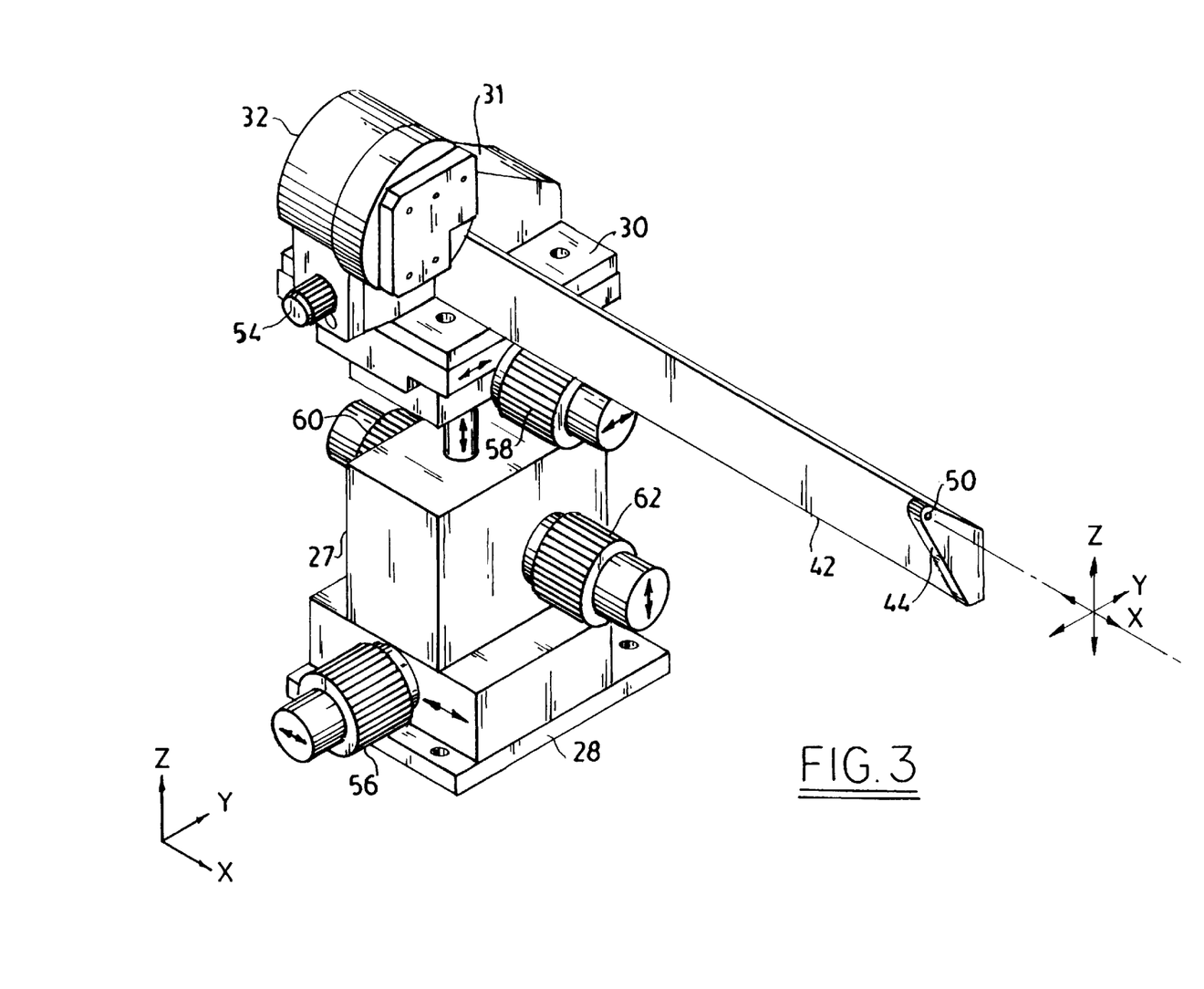
FIG. 3 is a perspective view which shows the cantilever mounting arm on which the frame is pivotally mounted on a rotating support which is part of an assembly for moving the frame in x and y directions in a horizontal plane and in a z direction vertically and perpendicular to the horizontal plane.

The tilt mechanism has a vernier tilt adjustment mechanism (FIGS. 16, 17, 18 and 18A) which is actuable by a knob 54. Other knobs 56 and 58 of the stage 27 provide for lateral adjustment 32 in the X and Y directions, respectively as shown in FIG. 3. The height of the tilt mechanism and of the frame assembly 34 with the wafer 20 thereon is adjustable in the Z direction by knobs 60 and 62 of the stage 27. These knobs provide access for adjustment from opposite sides of the stage 27 (see FIG. 2).

Figure 1A:
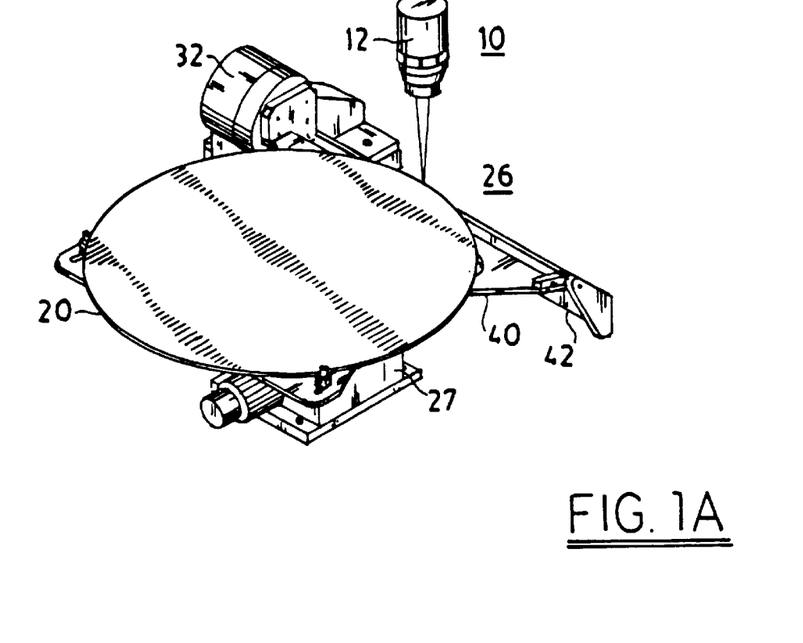
FIGS. 1A and B are perspective views similar to FIG. 1, showing the fixture in position for measuring the profile of the side surface of the wafer, and with the wafer titled at an acute angle with respect to the horizontal for measuring a bevel or radius between the edge and the side surface of the wafer, respectively.
Figure 1B:
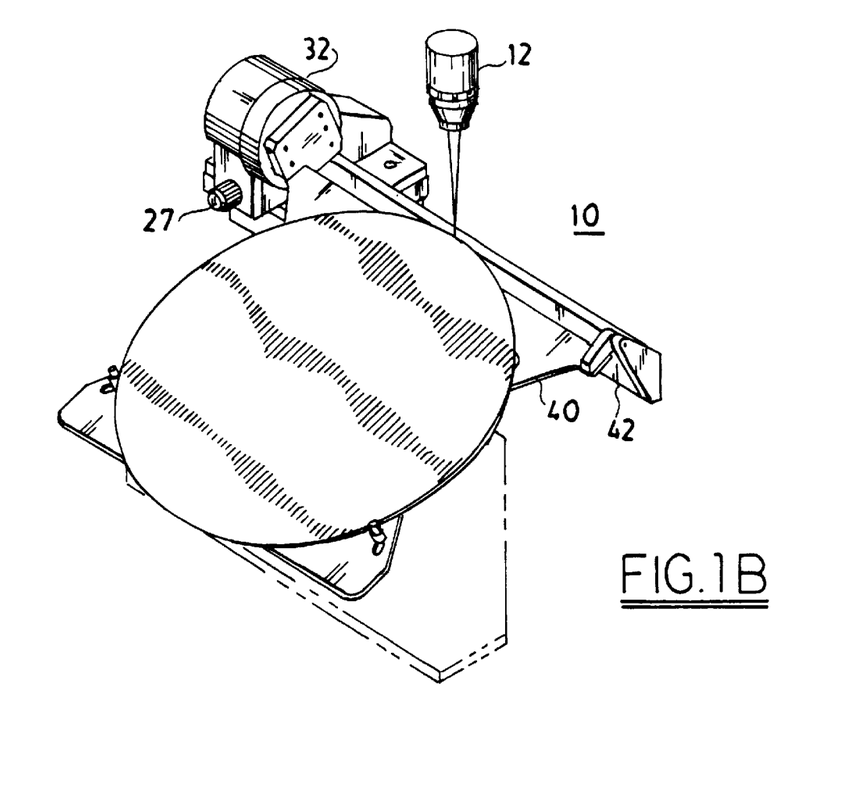
Figure 13:
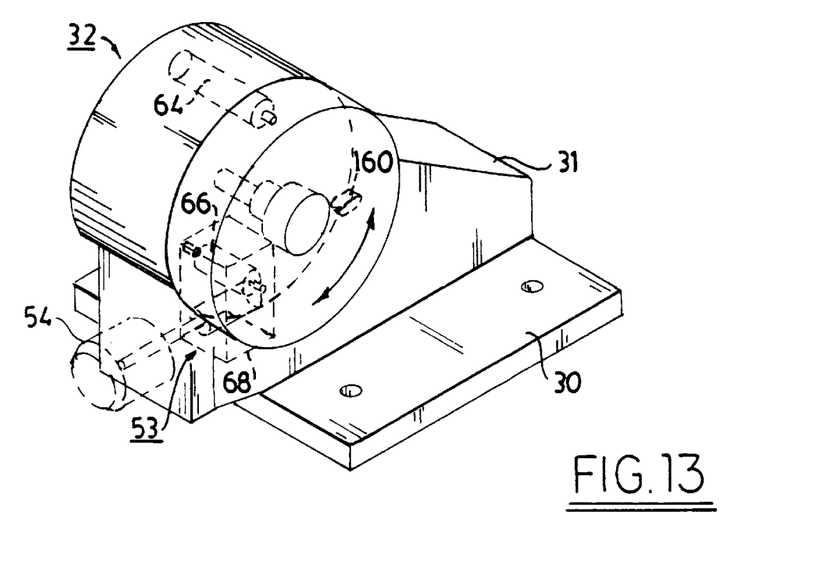
FIG. 13 is a perspective view of the tilting mechanism shown in FIG. 12 illustrating the stationary and rotating portions thereof, and detents; one of which enables the frame to be located in the 0 and 90 degree positions, and the other of which enables the frame to be located in a 22 degree position, the detent for the 22 degree position being located in a vernier tilt adjustment mechanism having a block slidable in a stationary part of the tilting mechanism, the block being movable by means of a knob and threaded shaft so as to vary the tilt position up to about 5 degrees on either side of its 22 degree position.
Figure 14:
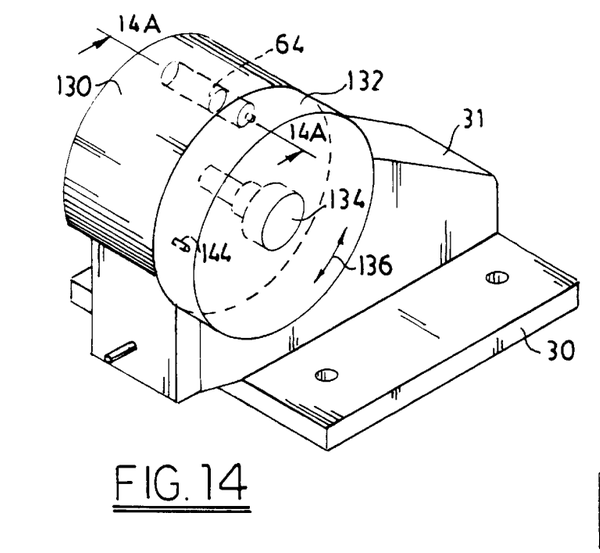
FIG. 14 is a view similar to FIG. 13 showing the rotating part of the tilting mechanism, which is connected to the frame, in its 90 degree position.
Figure 14A:
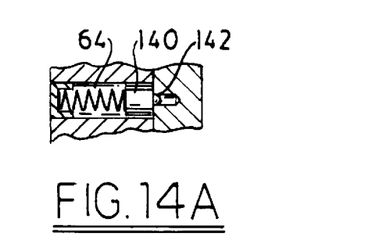
FIG. 14A is a fragmentary sectional view showing the detent holding the rotating part in its 90 degree position.
Figure 15:
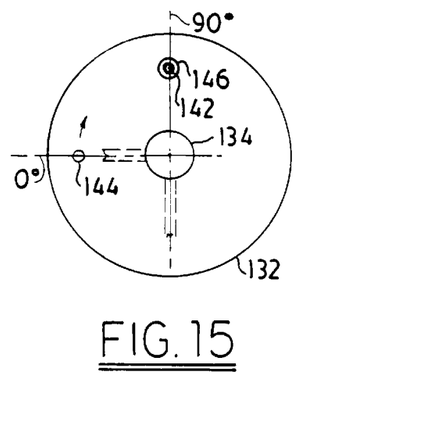
FIG. 15 is an end view of the rotating part showing the frame in phantom in the 0 and 90 degree positions (horizontal and vertical), respectively.
Figure 16:
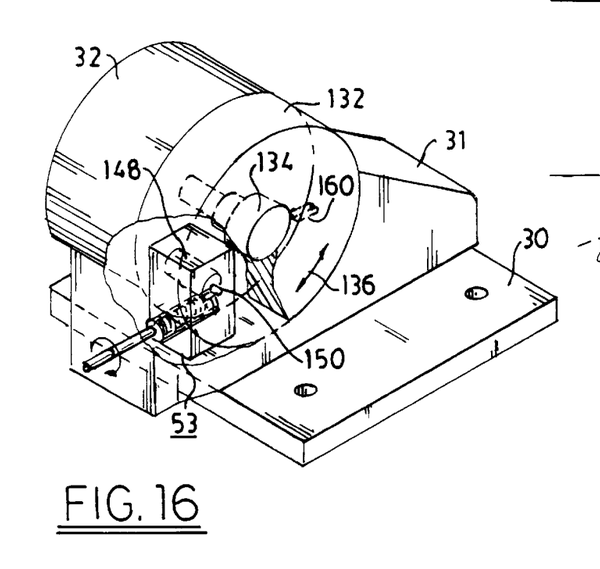
FIG. 16 is a view similar to FIG. 13 but limited to the vernier mechanism.
Figure 17:
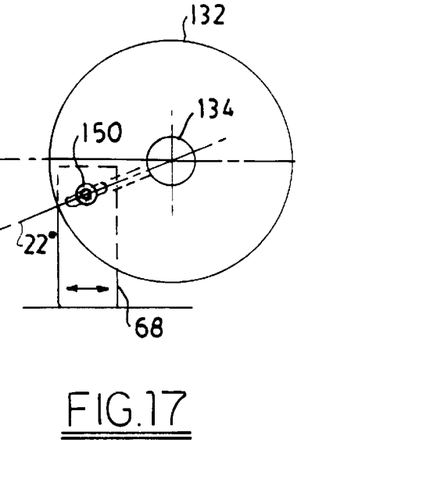
FIG. 17 is an end view similar to FIG. 15 but showing the frame (in phantom) in the 22 degree position.
Figure 18:
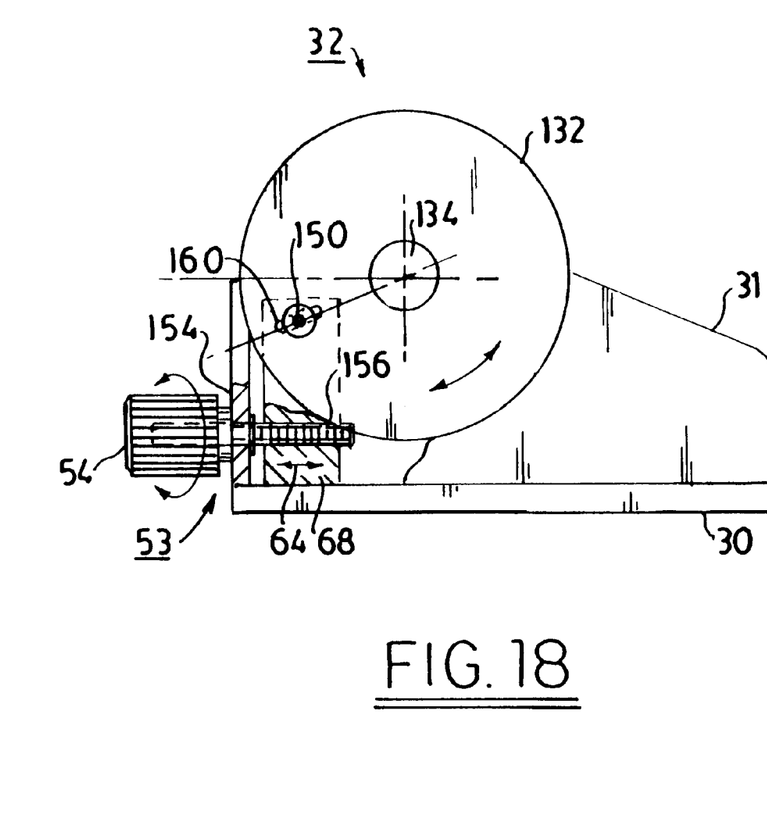
FIG. 18 illustrates the vernier adjustment mechanism in greater detail than in FIG. 16.
Figure 18A:
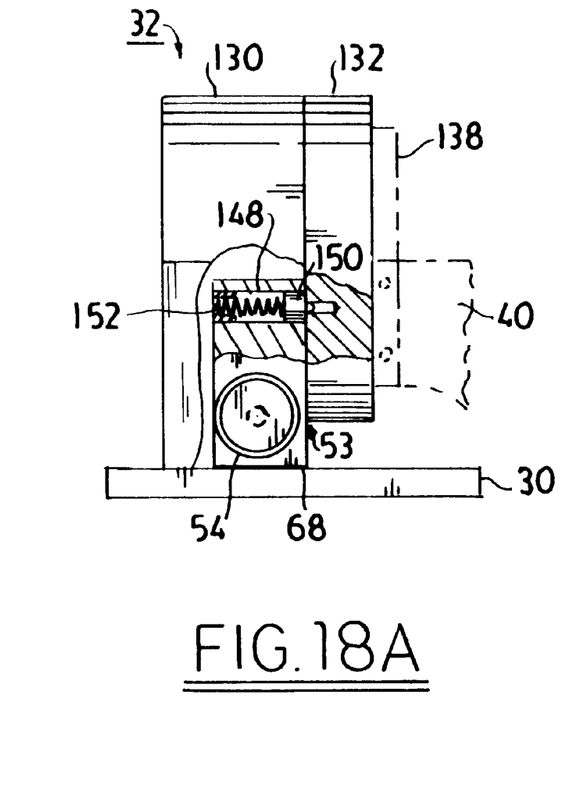
FIG. 18A is an end view partially broken away to show the vernier adjustment mechanism as well as the frame connected to the rotating part of the tilting mechanism via a frame support piece.

The frame assembly 34 and the tilt mechanism 32 are selectively positionable in three angularly spaced positions shown in FIGS. 1, 1A and 1B and are shown in the vertical or 90 degree position in FIG. 1. The frame assembly 34 is locked by the tilt mechanism in vertical using a detent 64 therein (see FIG. 13). The wafer and the frame mechanism may be oriented in a horizontal or zero degree position as shown in FIG. 1A by pulling the frame 40 outwardly (from 90 degree to 0 degree position). The detent 64 also locks the frame assembly 34 and wafer 20 in the horizontal position. Between the vertical and horizontal position there is an intermediate position at 22 degrees to which the frame is tilted and locked by another detent 66 in vernier mechanism 53 (FIG. 13). The detent 66 is contained in a movable block 68 which is part of a vernier mechanism 53 which also includes the knob 54. By turning the knob 54 the orientation or tilt of the frame plate 40 and the wafer thereon can be adjusted over a range of plus or minus 5 degrees from the 22 degree position. In either of the three positions, the stage 27 may be adjusted in the lateral X, Y plane containing the pivotal axis of the frame assembly 34. Also, by adjusting the Z or vertical position of the axis of rotation a coarse adjustment of the focus of the beam 18 may be made. The beam is fine-focused by optical means in the head 12.

The wafer 20 has a polished face 70 and a rear face 72 which may be rough compared to the face 70 (FIG. 5). When in the position shown in FIG. 1A, the profile of the polished face may be measured by shifting the lateral, X and Y controls. In the vertical position in FIG. 1 the profile and contour of the edge 74 of the wafer may be measured. In the intermediate orientation shown in FIG. 1B the profile and contour or slope of the bevel or radius between the side surface 70 and the edge 74 is measured. In the position shown in FIGS. 1A and 1B, X, Y and Z adjustments may be made so as to cover the surface area of the edge 74 and of the bevel/radius of the edge 74.

As will be discussed more fully hereinafter in connection with FIG. 5 the chuck assembly 36 provides for holding of the wafer upon attachment to the chuck 37 of the chuck assembly 36. Then in the vertical (90°) or intermediate (22 degree, plus or minus 5 degree) positions shown in FIGS. 1A and 1B, the edge or bevel/radius surface may be scanned to measure the profile contour thereof.

Referring FIGS. 4 through 8 there is shown the chuck assembly 36 mounted on the frame plate in a slot 80 bisected by the center line 82. The chuck assembly is made up of the vacuum chuck 37 which projects through the slot 80 and is connected through a rotatable seal 84 to a vacuum supply via an elbow pipe 86 and other piping not shown. A spur gear 88 is connected to a pinion gear 90 on the shaft of a motor 92. The chuck and the motor are connected to a slide 94. The vacuum chuck is rotatably mounted in the slide by a ball bearing 96 which extends through a hole 98 in the slide 94. The slide 94 is part of the chuck assembly 36 and mounts the chuck assembly for movement along a linear path in a pair of rails 100. The rails have holes which cooperate with detents 102 having pins which are spring biased outwardly so as to engage one set of four sets of holes 104. The chucks assembly is adjustable in position on the frame plate 40 in four positions corresponding to positions of the holes 104. Each of these positions satisfies the requirements for mounting of wafer discs of different diameters which are shown in phantom at 20a, b, c and d. These diameters range from 12" to 3.5" to correspond with the standard size for wafers which are used in magnetic storage disc and semi-conductor wafer manufacturing processes. The chuck assembly 36 may be manipulated by the operator and moved along the slot 80 to place the assembly 36 in a position corresponding to the diameter of the disc under test in the profilometer.

Figure 9:
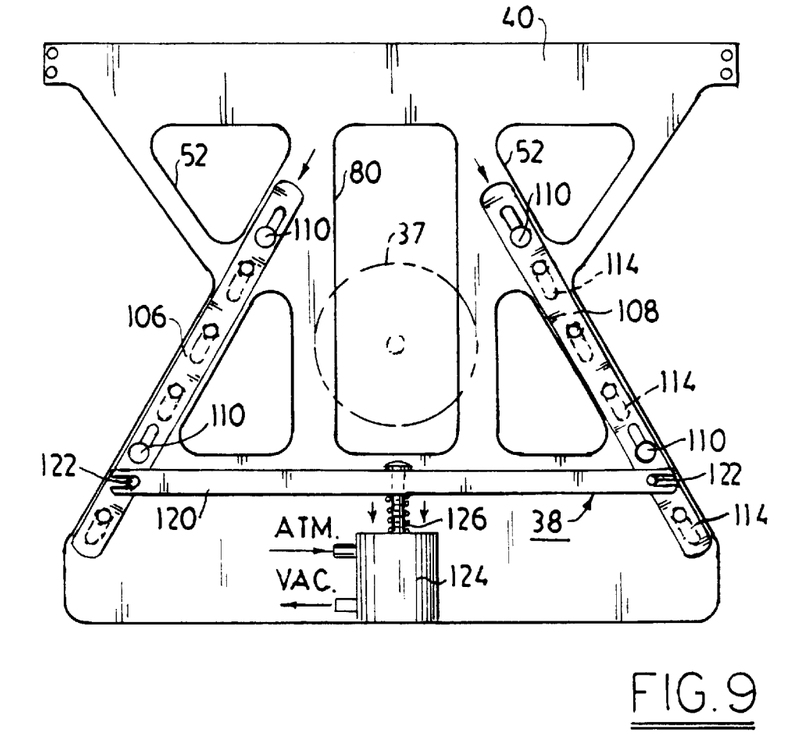
Figure 10:
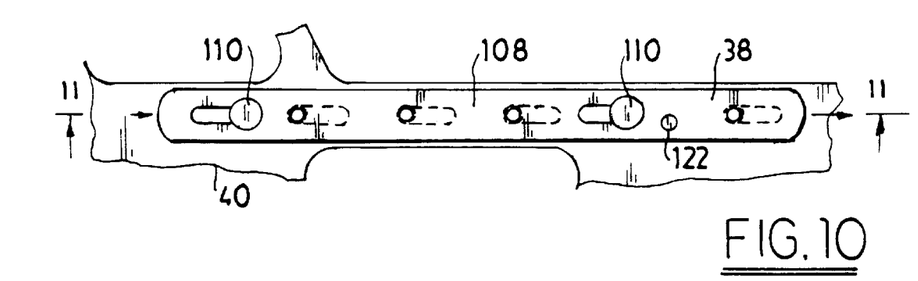
FIG. 10 is an enlarged view of one of the pin support bars which is shown on the right in FIG. 9.
Figure 11:
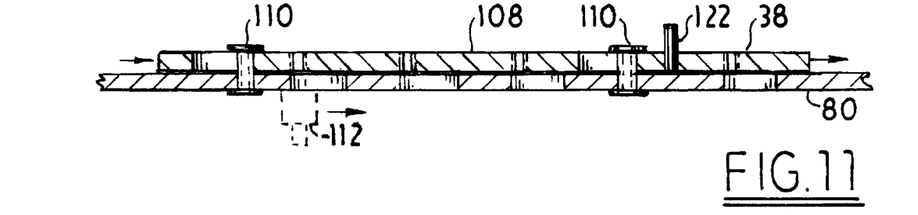
FIG. 11 is a fragmentary sectional view taken along the line 11—11 in FIG. 10.

In order to align the discs of different size with the vacuum chuck 37 so that the axis of rotation of the chuck is coincident with the center of the diameter of the wafer, the positioning mechanism 38 is used. As shown in FIGS. 9, 10 and 11 this mechanism includes a pair of bars 106 and 108 which are slidably mounted on the back side (the side facing away from the wafer) of the frame plate 40. The mounting is by means of flanged pins 110 which extend through the frame plate 20 and the bars 106 and 108. Positioning posts 112 are removably attached to the bars where they are held in holes at the rear ends thereof by screw threads on the posts and hole walls. The posts project through slots 114, there are four pairs of slots 114 although only three pairs are shown in FIG. 2 to simplify the illustration. The posts 112 are shown in perspective in FIGS. 1 and 2 located in the lower most slot which is positioned to align the disc 20A of largest diameter. In operation the wafers are placed against the posts on the frame over the vacuum chuck engagement plate which projects through the slot 80. The posts 112 are located in the one of the slots 114 which corresponds to the diameter of the wafer under test. When the vacuum chuck 37 exerts sufficient force (suction) to hold the rear side surface of the wafer against the chuck plate, the posts 112 are automatically withdrawn away from the edge of the wafer so as not to interfere with the rotation thereof by the vacuum chuck assembly. This automatic operation is provided by a cross bar 120 which is notched at the opposite ends thereof so as to receive pins 122 extending rearwardly from the bars 106 and 108. The cross bar is connected to an actuation cylinder 124 to the ports of which the vacuum supply and atmospheric pressure are presented. The piston shaft of the cylinder is biased by a spring 126 which applies a force to the cross bar corresponding to the vacuum force sufficient to hold the wafer on the vacuum chuck. Accordingly, when the vacuum force builds up to the holding force the bias of the spring 126 is overcome and the bars 106 and 108 are translated in a direction to bring the posts 112 away from the edge of the wafer under test.

Referring FIGS. 12 through 18A there is shown the tilt mechanism 32. This mechanism includes a part 130 in the form of a cylinder which is fixedly mounted to the support block 31 and therefore is fixed with respect to the stage 27. The tilt mechanism 32 also includes a rotary part 132 which is rotatably mounted on a shoulder screw 134 and rotates in the direction shown by the arrows 136. A mounting piece 138 on the front face of the rotary part 132 has the inside end of the cantilevered frame plate 40 attached thereto; the frame plate 40 being mounted on the cantilever beam 42 so as to rotate about the axis 21. The location and positioning of the frame assembly, the frame plate 40 and wafer carried thereon by the vacuum chuck is accomplished by manually pivoting the plate 40 between the 0°, 22° and 90° positions. In the 0° and 90° positions the detent 64 which is provided by a plunger 140 having a pin 142 which enters into 0° and 90° holes 144 and 146 and the rotary part 132.

The vernier mechanism 53 has a detent 148 with a pin ended plunger 150 and a biasing spring 152 mounted in the block 68 and movable therewith in response to rotation of the knob 54. The knob is journaled in the block 131 at a wall 154 so as to turn a screw threaded end 156 which is in a threaded bore in the block 68.

The rotary part 132 of the tilt mechanism 32 has a elongated blind slot 160 which receives the plunger pin 150. When the block 160 is in its center position (intermediate the threaded portion of the shaft 156) the plunger pin 150 locates the wafer 20 and its holding assembly at 22° with respect to the horizontal. By rotating the knob 54, the block 68 is moved laterally in the direction of the arrow 164. The walls of the slot 160 then cam the pin 150 as a follower so as to rotate the rotary part 132 over an angular range suitably plus and minus 5° from the 22° position.

From the foregoing description it will be apparent that there has been provided an improved profilometer and particularly a profilometer which is improved by virtue of the wafer holding and orienting fixture therein. Variations and modifications in the herein described profilometer and fixture, within the scope of the invention, will undoubtedly suggest themselves to those skilled in the art. Accordingly, the foregoing description should be taken as illustrative and not in a limiting sense.

We claim:

1. An optical profilometer having means for measurement of the profile of a surface of a member under test in response to an optical beam incident thereon, said surface being one of a plurality of surfaces of said member upon which said beam is incident for measurement of the profile thereof by said measurement means, and a mechanism for orienting said member, said mechanism including a frame supporting said member, means mounting said frame pivotally about an axis, and actuation means operative on said mounting means for orienting said frame in a plurality of positions angularly spaced about said axis whereby to present selected ones of said plurality of surfaces to said measurement means for measurement of the profile of said surfaces, said frame comprising means for removably attaching said member thereto, and means defining a plurality of positions for said member on said frame which aligns said member with said attaching means in accordance with the size of said member.

2. The profilometer according to claim 1 further comprising means assembled with said frame for removably attaching said member thereto while said orienting and measuring means are operative.

3. The profilometer according to claim 1 wherein said attaching means is rotatable about a second axis transverse to said first named axis whereby to rotate said member.

4. The profilometer according to claim 1 further comprising means for translating said mounting means in a plurality of directions, each transverse to said first named axis.

5. The profilometer according to claim 4 wherein said directions are X, Y and Z where X and Y are perpendicular to each other and in a plane containing said axis and Z is perpendicular to X and Y.

6. The profilometer according to claim 1 wherein said defining means comprises means movable into and out of engagement with said member during alignment and after attachment, respectively.

7. The profilometer according to claim 1 wherein said mounting means comprises a support which is stationary with respect to said frame, a cantilever beam extending from said support, said beam defining said pivotal axis and supporting said frame for rotation about said axis, and means attached to said support for tilting said frame about said axis to different ones of said plurality of positions.

8. The profilometer according to claim 7 wherein said tilting means comprises means operative when said frame is titled to at least one of said different positions for vernier angular adjustment of the angle to which said frame is tilted to said one of said different positions.

9. The profilometer according to claim 1 wherein said member is a wafer and said plurality of surfaces comprise the side surface of said wafer and an edge surface of said wafer.

10. The profilometer according to claim 9 wherein said plurality of surfaces further comprises a surface of said wafer intermediate between said side surface and said edge surface.

11. The profilometer according to claim 10 wherein said wafer is a disc having opposite side surfaces; one of which is opposed to said frame when attached thereto and the other faces away from said frame presenting said other side surface, said edge surface or said bevel or radius surface for profile measurement by said measurement means.

12. The profilometer according to claim 11 further comprising a rotatable assembly including a pneumatic chuck engageable with said one side surface of said disc, and means for rotating said assembly when said edge surface or said bevel or radius surface are presented for measurement of the profile thereof by said measurement means and said optical beam is incident thereon.

13. The fixture according to claim 12 further comprising a cantilever beam extending outwardly from and assembled to said stationary part at one end of said beam said frame being pivotally connected to said beam at an opposite end thereof, whereby to support said frame while connected to said rotatable part as a cantilever extending therefrom.

14. An orienting fixture for a wafer having side and edge surfaces which comprises a frame on which said wafer is mountable with its said side surface facing said frame, a tilt mechanism having a stationary part and a rotatable part, said frame being assembled to said rotatable part and extending as a cantilever from said rotatable part, first and second detent mechanisms in said stationary part, said first detent mechanism being fixed in said stationary part and said second detent mechanism being movable in said stationary part for providing vernier adjustment in a position to which said frame is tilted by said mechanism, said rotatable part having indentations aligned with vertical and horizontal tilt positions of said frame for receiving from said first detent mechanism a pin biased from said stationary part toward said rotatable part, and another indentation in the form of a radially extending detent pin receiving receptacle in which a pin in said second detent mechanism is movable radially when said frame is in a position between said vertical and horizontal tilt positions, said movement being over a path corresponding to a range of vernier tilt adjustment of said frame when rotated to said inbetween position.

\* \* \* \* \*